United States Patent
Xing et al.

(10) Patent No.: US 9,397,345 B2
(45) Date of Patent: Jul. 19, 2016

(54) CATHODES FOR LITHIUM-AIR BATTERY CELLS WITH ACID ELECTROLYTES

(71) Applicants: Yangchuan Xing, Rolla, MO (US); Kan Huang, Columbia, MO (US); Yunfeng Li, Columbia, MO (US)

(72) Inventors: Yangchuan Xing, Rolla, MO (US); Kan Huang, Columbia, MO (US); Yunfeng Li, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 276 days.

(21) Appl. No.: 13/949,875

(22) Filed: Jul. 24, 2013

(65) Prior Publication Data

US 2014/0038067 A1    Feb. 6, 2014

Related U.S. Application Data

(60) Provisional application No. 61/742,266, filed on Aug. 6, 2012.

(51) Int. Cl.
| | |
|---|---|
| *H01M 4/36* | (2006.01) |
| *H01M 4/86* | (2006.01) |
| *H01M 4/92* | (2006.01) |
| *H01M 12/08* | (2006.01) |
| *H01M 8/02* | (2016.01) |

(52) U.S. Cl.
CPC .......... *H01M 4/8657* (2013.01); *H01M 4/8605* (2013.01); *H01M 4/926* (2013.01); *H01M 8/0234* (2013.01); *H01M 8/0245* (2013.01); *H01M 12/08* (2013.01); *Y02E 60/50* (2013.01)

(58) Field of Classification Search
CPC . H01M 4/8657; H01M 4/8605; H01M 4/926; H01M 12/08; H01M 8/0234; H01M 8/0245; Y02E 60/50
USPC .................................................. 429/405, 535
See application file for complete search history.

(56) References Cited

U.S. PATENT DOCUMENTS

| | | | |
|---|---|---|---|
| 6,991,876 B2 | 1/2006 | Narang et al. | |
| 7,282,295 B2 | 10/2007 | Visco et al. | |
| 2002/0160251 A1* | 10/2002 | Chang ................... | H01M 4/366 429/528 |
| 2010/0002079 A1 | 1/2010 | Krijn et al. | |
| 2010/0273066 A1 | 10/2010 | Flanagan et al. | |
| 2011/0165462 A1 | 7/2011 | Zhamu et al. | |
| 2011/0165466 A1 | 7/2011 | Zhamu et al. | |
| 2011/0229777 A1* | 9/2011 | Mak .................... | H01M 4/8605 429/405 |
| 2013/0183592 A1* | 7/2013 | Roev ................... | H01M 4/8605 429/405 |

OTHER PUBLICATIONS

A dual-electrolyte rechargeable Li-air battery with phosphate buffer catholyte; Li et al.; Elsevier, Electrochemistry Communications 14 (2012) pp. 78-81.

A novel high energy density rechargeable lithium/air battery; Zhang et al.; The Royal Society of Chemistry 2010, Chem. Commun., 2010, 46, pp. 1661-1663.

(Continued)

*Primary Examiner* — Gary Harris
(74) *Attorney, Agent, or Firm* — Polster Lieder (57) ABSTRACT

In various embodiments, the present disclosure provides a layered metal-air cathode for a metal-air battery. Generally, the layered metal-air cathode comprises an active catalyst layer, a transition layer bonded to the active catalyst layer, and a backing layer bonded to the transition layer such that the transition layer is disposed between the active catalyst layer and the backing layer.

9 Claims, 10 Drawing Sheets

(56) References Cited

OTHER PUBLICATIONS

A study on lithium/air secondary batteries—Stability of NASICON-type glass ceramics in acid solutions; Shimonshi et al.; Elsevier, Journal of Power Sources 195 (2010) pp. 6187-6191.

Effects of porosity change of gas diffuser on performance of proton exchange membrane fuel cell; Chu et al.; Elsevier, Journal of Power Sources 123 (2003) pp. 1-9.

Effects of the cathode gas diffusion layer characteristics on the performance of polymer electrolyte fuel cells; Antolini et al.; Journal of Applied Electrochemistry 32: pp. 383-388, 2002.

H+ diffusion and electrochemical stability of Li1+x+yAlxTi2-xSiyP3-yO12 glass in aqueous Li/air battery electrolytes; Ding et al.; Elsevier, Journal of Power Sources 214 (2012) pp. 292-297.

Li/Polymer Electrolyte/Water Stable Lithium-Conducting Glass Ceramics Composite for Lithium-Air Secondary Batteries with an Aqueous Electrolyte; Zhang et al.; ECS, Journal of the Electrochemical Society 155 (12) pp. A965-A969 (2008).

Lithium-Air Batteries Using SWNT/CNF Buckypapers as Air Electrodes; Zhang et al.; ECS, Journal of the Electrochemical Society 157 (8) pp. A953-A956 (2010).

Li-air batteries: A classic example of limitations owing to solubilities; Kowalczk et al.; Pure Appl. Chem., vol. 79, No. 5, pp. 851-860, 2007.

Li-Air Rechargeable Battery Based on Metal-free Graphene Nanosheet Catalysts; Yoo et al.; ACS Nano, vol. 5, No. 4, pp. 3020-3026, 2011.

Stability predictions of solid Li-ion conducting membranes in aqueous solutions; Wolfenstine; Army Research Labratory, J Mater Sci (2010) 45, pp. 3954-3956.

Study on lithium/air secondary batteries—Stability of NASICION-type lithium ion conducting glass-ceramics with water; Hasegawa et al.; Journal of Power Sources 189 (2009) pp. 371-377.

Buckypaper-based catalytic electrodes for improving platinum utilization and PEMFC's performance; Zhu et al.; Elsevier, Electrochimica Acta 55 (2010) pp. 2555-2560.

\* cited by examiner

CATHODES FOR LITHIUM-AIR BATTERY CELLS WITH ACID ELECTROLYTES

CROSS-REFERENCE TO RELATED APPLICATIONS

This application claims the benefit of U.S. Provisional Application No. 61/742,266, filed on Aug. 6, 2012. The disclosure of the above application is incorporated herein by reference in its entirety.

GOVERNMENT RIGHTS this invention was made with Government support under Grant No. DEAR0000066 awarded by the Department of Energy. The Government has certain rights in the invention.

FIELD

The present teachings relate to metal-air electrochemical batteries, and more specifically, to the cathodes of metal-air electrochemical batteries with aqueous electrolytes, and more specifically, with acidic electrolytes.

BACKGROUND

The statements in this section merely provide background information related to the present disclosure and may not constitute prior art.

Metal-air batteries, e.g., Li-air batteries, have gained much attention as energy storage systems due to their high energy densities, comparable to that of gasoline in theoretical values. An advantage of metal-air batteries is that oxygen is not stored in the cathode, but acquired free from ambient air during discharge. Typical known metal-air batteries utilize a non-aqueous electrolyte to avoid the intensive reaction between water and the metal, e.g., Li. For aqueous electrolytes, there needs to be a separator to separate the aqueous solution from the metal. Additionally, the material of such air cathodes must be impermeable to aqueous electrolytes so that the aqueous electrolyte stays in the cell. Generally, an air cathode for a rechargeable metal-air battery is multifunctional in that it must be permeable to oxygen gas from the ambient atmosphere and provide active sites or reaction zones for the oxygen reduction reaction (ORR) and oxygen evolution reaction (OER). In order to fulfill these functions well, such air cathodes are typically a sheet-like component having opposite surfaces that are respectively exposed to the ambient atmosphere and to an aqueous electrolyte.

Such known metal-air electrochemical batteries with non-aqueous electrolytes are cathode-limited because the electrolytes cannot dissolve the solid metal oxide, e.g., lithium oxide, products, which clog the pores and choke the air breathing cathode. In addition, moisture in ambient air can degrade non-aqueous electrolytes and react with lithium metal causing self-discharge. These problems directly lead to a short life of non-aqueous Li-air battery.

SUMMARY

Aqueous-based metal-air electrochemical batteries, e.g., aqueous-based Li-air batteries, represent an alternative to known non-aqueous metal-air electrochemical batteries, e.g., non-aqueous based Li-air batteries, to provide long operational battery life. For example, a water-stable lithium electrode can be developed by employment of a lithium ion conducting glass ceramic (LiCGC) membrane, similar to that used in some known nickel-lithium battery (e.g., batteries having a LISICON design). Such an impermeable LiCGC membrane can prevent direct lithium reaction with water. Consequently, a hybrid electrolyte Li-air battery (HyLAB) can be constructed.

Aqueous electrolytes of acidic, neutralized, and basic solutions have been used in HyLABs in recent years. Neutralized and basic electrolytes have an overall reaction of $2Li+H_2O+0.5O_2=2LiOH$, and the theoretical cell potential is 3.43 V. In acidic electrolytes, especially strong acid solutions, the cell reaction is $2Li+0.5O_2+2H^+=2Li^++H_2O$, which yields a theoretical open circuit voltage (OCV) of 4.274 V. Acids can dissolve lithium oxide, preventing clogging in the air breathing channels in the cathode.

Such cells can have a practical discharge potential of about 3.5 V or higher at a discharge current density of 0.2 mA/cm$^2$, which is much higher than that of non-aqueous electrolyte cells (e.g., 2.6-2.7 V). Furthermore, smaller charge-discharge polarizations have been observed in acidic electrolyte cells with the use of a Platinum (Pt) catalyst, necessary for the oxygen reduction reaction (ORR) at the cathode, which is $O_2+4H^++4e^-=2H_2O$, involving 4 electron transfer in acidic medium.

Relevant studies of rechargeable HyLAB using acidic electrolytes used cathodes consisting of a catalyst (e.g., Pt) supported on carbon black, similar to those used in conventional polymer electrolyte membrane fuel cells. Such cathodes are often thick with large resistance to oxygen diffusion. As a result, they must contain much more Pt catalysts (e.g., Pt-black or 40 wt. % Pt/C), increasing the cost of such batteries.

In various embodiments, the present disclosure provides layered metal-air cathode for a metal-air battery. Generally, the layered metal-air cathode comprises an active catalyst layer, a transition layer bonded to the active catalyst layer, and a backing layer bonded to the transition layer such that the transition layer is disposed between the active catalyst layer and the backing layer.

In various other embodiments, the present disclosure provides a carbon nanotube based buckypaper cathode in a hybrid electrolyte metal-air battery, e.g., a hybrid electrolyte Li-air battery (HyLAB), that provides outstanding discharging performance. The hybrid battery has sulfuric acid as the catholyte. In various embodiments, the active cathode layer can be made from a buckypaper with a catalyst supported on carbon nanotubes (e.g., Pt/CNTs) for oxygen reduction and evolution.

The hybrid battery of the present disclosure, having sulfuric acid as the catholyte, can achieve high discharging current densities while maintaining relatively high cell potentials. For example, in testing, the hybrid battery with Pt/CNTs achieved a discharging capacity of 306 mAh/g with the mass based on the sulfuric acid and a cell voltage of 3.15 V at 0.2 mA/cm$^2$. The corresponding specific energy was 1067 Wh/kg based on the total weight of the sulfuric acid. While the testing showed a slow decrease in performance, the performance can be recovered by refilling the cell with new electrolyte after continuous discharging of more than 75 hours. For example, a charge-discharge experiment at 0.2 mA/cm$^2$ showed that the cell was rechargeable with a capacity of more than 300 mAh/g.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

As used herein it will be understood that CNF is the abbreviation for carbon nanofiber, CNT is the abbreviation for carbon nanotubes, CB is the abbreviation for carbon black, SEM is the abbreviation for scanning electron microscope, and XRD is the abbreviation for X-Ray diffraction.

Figure 1:
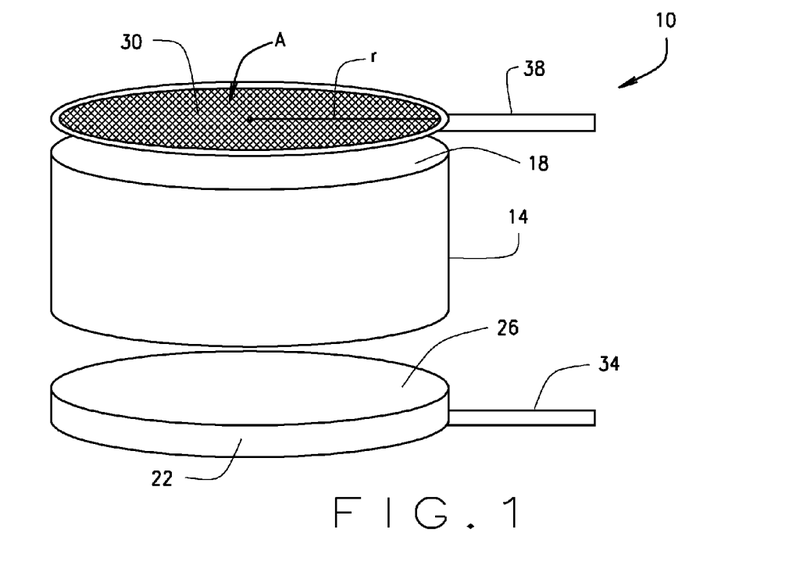
FIG. 1 is a block diagram of a hybrid metal-air battery having a sulfuric acid catholyte, a sealed anode, and a metal-air cathode, in accordance with various embodiments of the present disclosure.

Referring to FIG. 1, the present disclosure provides a rechargeable hybrid metal-air battery 10, e.g., a hybrid Li-air battery (HyLAB), having a hierarchical electrode structure that is structured and operable to enhance air breathing and effective catalysts to accelerate electron generations.

Metal-air batteries produce electricity by electrochemically incorporating a cell with a reactive, protected/unprotected metallic anode to an air cathode through a suitable electrolyte. A variety of anode metals are used, including but not limited to, alkali and alkali earth metals, such as lithium, sodium, magnesium, some other metals or alloys such as zinc, aluminum, iron etc. Among these metals or alloys Lithium (Li) is considered especially advantageous for particular applications owing to its light density and high specific energy. Although the hybrid battery 10 can be any hybrid metal-air battery, for clarity and simplicity, the hybrid battery 10 will be exemplarily described and referred to herein as a hybrid Li-air battery (HyLAB), but such exemplary embodiments should not be viewed as narrowing the scope of the present disclosure.

Generally, the hybrid metal-air battery 10, e.g., a HyLAB, includes a body 14 that retains an aqueous electrolyte 18, e.g., a sulfuric acid catholyte, a sealed anode 22 containing a metal or its alloy foil 26, e.g., a Li foil 26, a layered metal-air cathode 30, e.g., a layered Li-air cathode, an anode lead 34 connected to the anode 22 and a cathode lead 38 connected to the metal-air cathode 30. The anode lead 34 and metal-air cathode lead 38 are connectable to an electrical load (not shown) that utilizes the electric potential stored in the hybrid battery 10, e.g., the HyLAB 10. In various embodiments, the aqueous electrolyte 18 comprises an aqueous catholyte, e.g., sulfuric acid. As described above, the hybrid metal-air battery 10, having the hierarchical electrode structure, particularly the layered metal-air cathode 30 is capable of generating high discharge power density, facilitating air diffusion, and is resistant to wet-through problems.

Although the hybrid battery 10 can be any hybrid metal-air battery, for clarity and simplicity, the hybrid battery 10 will be exemplarily described and referred to herein as a hybrid Li-air battery (HyLAB) 10, and the layered metal-air cathode 30 will be referred to herein as the Li-air cathode 30, but such exemplary embodiments should not be viewed as narrowing the scope of the present disclosure.

Figure 2:
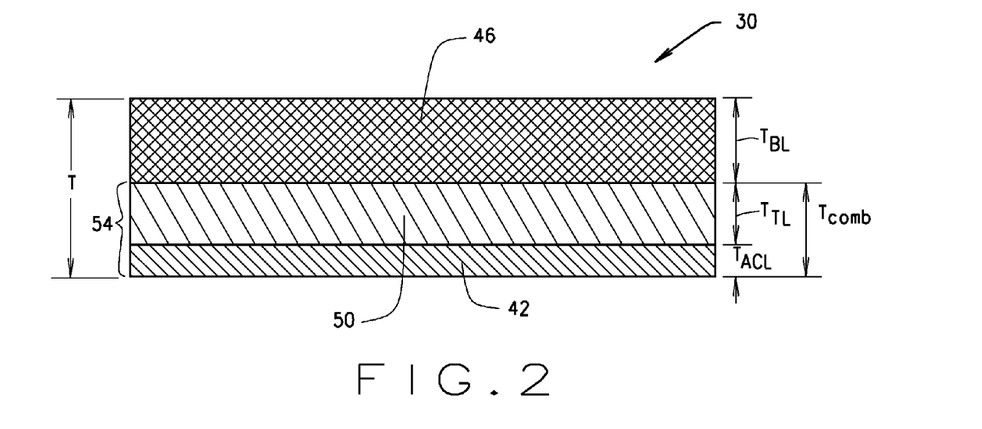
FIG. 2 is cross-sectional view of the metal-air cathode shown in FIG. 1, in accordance with various embodiments of the present disclosure.
Figure 3A:
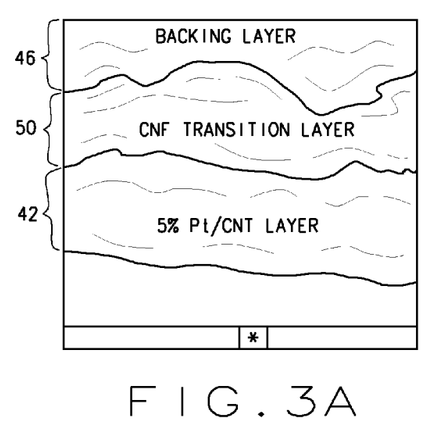
FIGS. 3A, 3B, 3C and 3D provide scanning electron microscope (SEM) images of the metal-air cathode of the hybrid metal-air battery shown in FIG. 1, wherein the metal-air cathode exemplarily is a Li-air cathode, such as that shown in FIG. 2, wherein: (A) is a cross-section of 5 wt. % Pt/CNT layer on a carbon nano-fiber (CNF) transition layer; (B) is a surface morphology of (A); (C) is a cross-section of 5 wt. % Pt/CB on a CNF transition layer; and (D) is a surface morphology of (C), in accordance with various embodiments of the present disclosure.
Figure 3B:
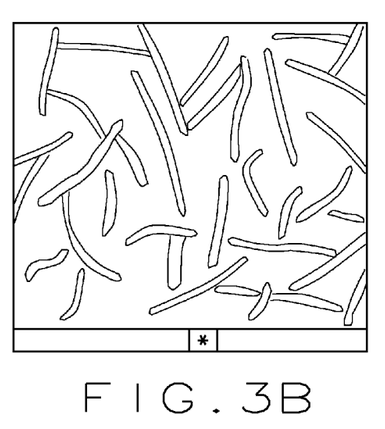
Figure 3C:
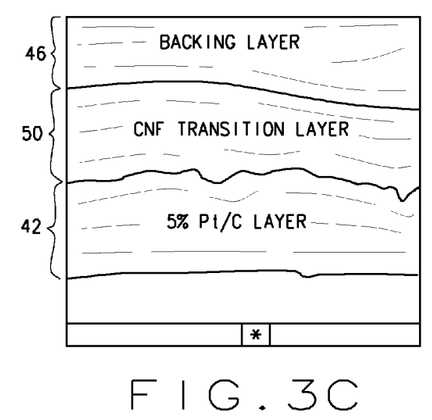
Figure 3D:
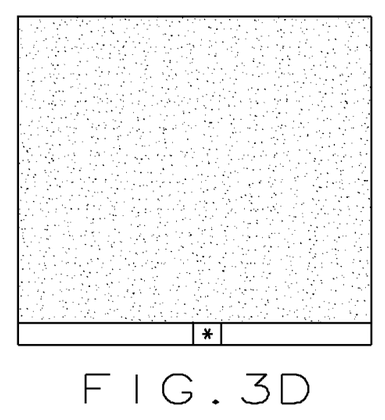

Referring now to FIG. 2, in various embodiments the layered metal-air cathode 30, e.g., the Li-air cathode 30 comprises an active catalyst layer 42, a backing layer 46, and a transition layer 50 disposed between the active catalyst layer 42 and the backing layer 46. In various implementations the active catalyst layer 42, backing layer 46, and transition layer 50 are laminated together by a hot-pressing process. The backing layer 46 is structured and operable to support the active catalyst layer 42 and the transition layer 50 and for collecting current to external circuitry (not shown). In various implementations the layered Li-air cathode 30 is fabricated, or prepared, to have a total thickness T between 4-400 μm in order to maximize oxygen diffusion through the layered Li-air cathode 30.

The catalyst active layer 42 is fabricated, or prepared, from electrocatalyst particles loaded onto nanosize carbon materials, for example, carbon nanotubes (CNTs), carbon nanofibers (CNFs), active carbon powders, or graphene layers. The electrocatalyst can be any suitable electrocatalyst such as a noble metal, e.g., platinum (Pt), palladium (Pd), iridium (Ir), etc., or a metal oxide, e.g., titanium oxide ($TiO_2$), niobium oxide (Nb2O5, $NbO_2$), manganese oxide ($MnO_2$), iridium oxide ($IrO_2$), etc., or composites of such oxides. In various implementations the catalyst loading percentage of the catalyst active layer 42 can be from 1% to 50%, e.g., 5% compared to the carbon, e.g., the CNTs or CNFs, in weight. Additionally, in various implementations the active catalyst layer 42 can comprise 5% Pt and/or be fabricated, or prepared, to have a thickness $T_{ACL}$ of between 1-100 μm, e.g., 20-30 μm.

Since both oxygen reduction reaction (ORR) and oxygen evolution reaction (OER) require a 3-phase reaction zone consisting of air, an electrolyte and a supported catalyst, the active catalyst layer 42 must be wetted in order for oxygen reduction to occur. Sufficient wetting of the active catalyst layer 42 is important to ORR or OER, but if too much wetting happens, the layered Li-air cathode 30 can wet-through it entirely. However, the active catalysts layer 42 can also be partially wetted. Thus, in various embodiments, the active catalytic layer 42 comprises a hydrophobic organic polymer, such as polytetrafluoroethylene (PTFE), e.g., 0%-30% by weight.

In various embodiments, the transition layer 50 can comprise a carbon nanofiber (CNF) substrate having a high aspect length/diameter ratio, e.g., 10 to 1000, and approximately 20%-70% of hydrophobic organic polymer, e.g., PTFE, by weight. The high length/diameter aspect ratio of CNF provides high porosity and reduces dead-end channels in the CNF layer. Additionally, the transition layer 50 provides a textured interface to support the active catalyst layer 42 and minimize evaporation of the aqueous electrolyte 18, e.g., sulfuric acid, retained within the body 14. Furthermore, in various implementations the transition layer 50 can be fabricated, or prepared, to have a thickness $T_{TL}$ of between 5-100 μm, e.g., 10-50 μm. Still further, in various implementations, the transition layer 50 has a higher percentage of hydrophobic organic polymer, e.g., PTFE, than the active catalyst layer 42, e.g., 20%-70% by weight, such that the CNF layer is highly hydrophobic and substantially prevents the layered Li-air cathode 30 from wetting-through and allowing loss of the aqueous electrolyte 18.

The backing layer 46 is fabricated, or prepared, of a fibrous or woven structured conductor with high porosity. For example, in various embodiments, the backing layer 46, can be fabricated, or prepared, of a carbon paper, a carbon cloth, or metal mesh. Importantly, the backing layer 46 comprises a plurality of open channels having a variety of sizes in order to facilitate air diffusion into the layered Li-air cathode 10. Additionally, in various implementations, the backing layer 46 comprises a hydrophobic organic polymer, e.g., PTFE, such that the backing layer 46 is permeable to air, but not to the aqueous electrolyte 18, e.g., sulfuric acid. However, since the backing layer 46 is structured and operable to collect current, in various implementations, the backing layer 46 comprises approximately 5-70%, e.g., 20-30% by weight of the hydrophobic organic polymer to allow for the current collection. Furthermore, in various embodiments, the backing layer 46 has a thickness $T_{BL}$ of between 30-500 μm, e.g., 80-200 μm, to ensure a strong mechanical support of the active catalyst layer 42 and the transition layer 50.

In various embodiments, the layered metal-air cathode 30, e.g., the layered Li-air cathode 30, can be fabricated, or prepared, by combining the active catalyst layer 42 comprising catalyst loaded carbon nanomaterials, e.g., CNFs or CNTs, with the CNFs transition layer 50 to form a combined catalyst/transition layer 54. In various embodiments, the combined catalyst/transition layer 54 has a thickness $T_{comb}$ of between 10-200 μm, e.g., 30-80 μm. Subsequently, the combined catalyst/transition layer 54 is laminated, e.g., hot pressed, onto a backing layer 46, e.g. carbon paper, at a selected temperature of approximately 100° C. to 300° C., e.g., 150° C. to 200° C.) and a selected pressure of approximately 1-10 MPa, e.g., 3-5 MPa, with the transition layer 50 in contact with the backing layer 46. During the lamination process, the fibrous structure of CNF transition layer 50 is compressed only along the direction of pressure, i.e., perpendicular to the surface of the layered cathode 30 such that the fibrous nanomaterials of the active catalyst layer 42 and the transition layer 50 are intertwined in the horizontal directions (i.e., in plane), such that open channels for air diffusion are formed. As described above, in various embodiments, the total thickness T of the layered cathode 30 can be between 4-400 μm, e.g., 100 μm.

Hence, the hierarchical structure of the layered metal-air cathode 30, e.g., the layered Li-air cathode 30, as described above, enhances air breathing of the hybrid metal-air battery 10, e.g., the HyLAB 30. And, the structure and composition of the active catalyst layer 42, having Pt and/or $IrO_2$ as the catalyst, as described above, accelerates electron generation, which helps accelerate electron generation.

Experimental Results

Experiments were performed on various rechargeable HyLABs 10 comprising an aqueous sulfuric acid catholyte and a layered Li-air cathode 30, in accordance with the description set forth above. The hybrid metal-air batteries 10, e.g., the HyLABs 10, tested will sometimes be referred to hereafter as cells. Sulfuric acid is chosen as the catholyte, because in addition to the advantages of acids mentioned above, sulfuric acid provides electrochemical stability and non-volatility during battery charge-discharge. Sulfuric acid also has a relatively high theoretical capacity (479 mAh/g with Li mass included and 546 mAh/g without Li metal) and a specific energy (2046 Wh/kg). Since carbon nanotubes (CNTs) and carbon black (CB) can yield different porosity and structures in the Li-air cathode 30, two structures of the catalyst layer 42, one with CNTs and the other with CB, were fabricated and their cell performances compared.

Li-air cathode preparation. The layered Li-air cathode 30 was prepared as follows. 10 mg carbon nanofibers (CNF ~150 nm in diameter and ~10 μm long) and 10 mg Pt/CNT catalysts (5 wt. % Pt) were dispersed under sonication in approximately 8 mL ethanol in two separated beakers. First, the CNF ethanol dispersion was vacuum filtered through a 0.4 μm membrane having 47 mm diameter. Then filtration of the 10 mg Pt/CNT ethanol dispersion was done on the same membrane covered with the CNF layer. This produced the combined catalyst/transition layer 54 based on the Pt/CNTs. The resulted total thickness of the combined catalyst/transition layer 54 was approximately 60 μm. Subsequently, the combined catalyst/transition layer 54 was laminated onto a Toray carbon paper at 140° C. and a pressure of 2 atm, with the CNF side on the Toray paper. Repeating the same process using a 5 wt. % Pt supported on carbon black (Pt/CB) catalysts produced the combined catalyst/transition layer 54 with the CB structure. Again, the transition layer 50 was CNF. The CNF transition layer 50 served well to support both the Pt/CNT and the Pt/CB catalyst layers 42. The total thickness T of the layered Li-air cathode 30, after hot press, was approximately 150 μm.

HyLAB battery assembly. The HyLABs 10 tested comprised a sealed anode 22 and the Li-air cathode 30 described above having an effective area of 10 cm$^2$. In order to prevent electric shorts between the Li-air cathode 30 and the anode 22, the body 14 was covered with Teflon® tape. The advantage of using a Teflon tape is that it has hydrophobic properties that prevent the aqueous sulfuric acid catholyte 18 from leaking. At the beginning of the experiment, the catholyte 18 comprised pure 1.0 M H$_2$SO$_4$ and had a volume of 5.0 mL.

HyLAB performance test. Tests of the HyLABs 10 were performed in an ambient environment and at room temperature (e.g., 25° C.). An Arbin battery test station (GT2000) connecting to a computer installed with the Arbin Data Pro software was used in the charge-discharge and data collection. For each HyLAB 10, the discharge current density was chosen as 0.01 mA/cm$^2$, 0.1 mA/cm$^2$, 0.2 mA/cm$^2$, 0.5 mA/cm$^2$, or 1.0 mA/cm$^2$. For long-term discharge and charge experiments, a current density of 0.2 mA/cm$^2$ was used.

Results and discussion. The thickness of 10 mg of CNFs filtered onto the filter membrane produced a transition layer 50 having the thickness TTL of 30-35 μm and 10 mg of Pt-loaded carbon produced an active cathode layer 42 having the thickness TACL of 20-25 μm, which were confirmed by their cross-sections through SEM. The cross-section and surface morphology of the layered Li-air cathodes 30 were characterized by SEM, as shown in FIG. 3. In either case of Pt/CNT or Pt/CB, the total thickness Tcomb of the combined catalyst/transition layer 54 is about 50 μm after hot press.

A hot press procedure was utilized to yield a strong interaction between the carbon paper backing layer 46 and combined catalyst/transition layer 54. It is noted that the CB particulate structure (with low aspect ratio particulates) was constricted in each direction under high pressure, which led to compactness, low porosity, and the formation of dead-ended channels in this process. However, due to the fibrous structure of CNTs, the CNTs were compressed only along the direction of pressure (perpendicular to the surface of the HyLAB 10) in the hot press process. Consequently, the CNTs were intertwined in the horizontal direction (i.e., in plane) with respect to the orientation of FIG. 3, forming open channels for air diffusion. Still further, the Pt/CNT formed an open combined catalyst/transition layer 54 and remained porous after hot press (see FIGS. 3A and 3B). However, the Pt/CB formed a compact layer with fewer porous channels after hot press (see FIGS. 3C and 3D). The surface morphologies of these cathodes are very much different in the catalyst layers, as can be seen from their SEM images. Consequently, their porous structures have direct effect on the Li-air cell performance as shown below.

Typically for acidic electrolytes, such as sulfuric acid, the calculated discharge open circuit voltage (OCV) is 4.274 V at 25° C., assuming a 4 electron reaction for the reduction of oxygen. The HyLABs 10 tested exhibited OCVs in the range of 3.95-4.02 V, depending on the different carbon materials and electrocatalysts. Therefore, the difference between the theoretical and actual OCVs is small. The result was attributed to the better ORR activity in H$_2$SO$_4$ because of higher concentration of protons in the H$_2$SO$_4$ solution, despite the fact that the layered Li-air cathode 30 used a low loading Pt catalyst (i.e., 5 wt. %). Geometrical loading of Pt in the layered Li-air cathode 30 is calculated to be only 5×10$^{-5}$ g/cm$^2$ (electrode area), but it was found good enough to produce a current flow comparable to that of non-aqueous electrolyte cells.

Figure 4:
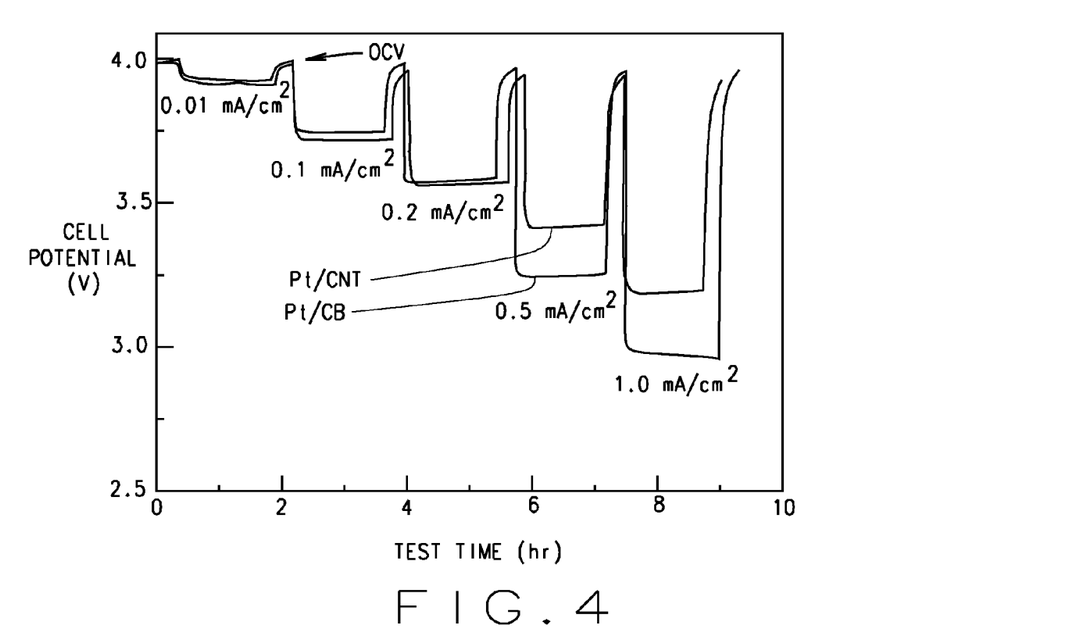
FIG. 4 is an exemplary graphical illustration of the performance of the hybrid battery shown in FIG. 1, having a Li-air cathode, such as that shown in FIG. 2, at different discharge current densities, wherein the Li-air cathode has an area of 10 $cm^2$, and wherein the HyLAB was tested with the Li-air cathode comprising a 5 wt. % Pt/CB catalyst, and comprising a 5 wt. % Pt/CNT catalyst, in accordance with various embodiments of the present disclosure.

The potential of the HyLABs 10 having the Pt/CNT combined catalyst/transition layer 54 dropped from 3.72V discharging at 0.1 mA/cm$^2$ to 3.43V at 0.5 mA/cm$^2$ for the, as shown in FIG. 4. The polarization of the HyLABs 10 was mainly due to the cell resistance derived from contact resistance at the anode side particularly the contact resistance between the sulfuric acid catholyte 18 and the combined catalyst/transition layer 54, e.g., a LiCGC membrane. At low discharge currents, the performance (potential) of the Pt/CNT HyLABs 10 were about the same as the Pt/CB Hylabs 10. The potentials for both embodiments were around 3.72V at 0.1 mA/cm$^2$ and 3.58V at 0.2 mA/cm$^2$. However, as the discharge current density was increased to 0.5 mA/cm$^2$, the cell potential of the Pt/CNT HyLABs 10 surpassed that of the Pt/CB HyLABs 10, with a difference of approximately 160 mV. When the current density increased to 1.0 mA/cm$^2$, the potential difference increases at 220 mV, with 3.21V for Pt/CNT HyLABs 10 and 2.99V for Pt/CB HyLABs 10, demonstrating the advantage of CNT Li-air cathode structure.

At high discharging current densities, air diffusion would become a limiting factor to the performance HyLABs 10. This was especially evident in the Pt/CB HyLAB 10 when discharged at 1.0 mA/cm$^2$. It was observed that the potential of the Pt/CB HyLABs 10 dropped along with discharge time (~10 hours, see FIG. 4), as a result of diffusion limitation in the less porous CB layer. In contrast, the Pt/CNT HyLabs 10 showed an even increase in potential level during the discharge cycle. Hence, the result demonstrated that the fibrous CNTs as catalyst support are superior to the granular CB. It should be noted that when the HyLABs 10 were stopped for discharging, their potentials reached back and rose to the OCVs.

Figure 5:
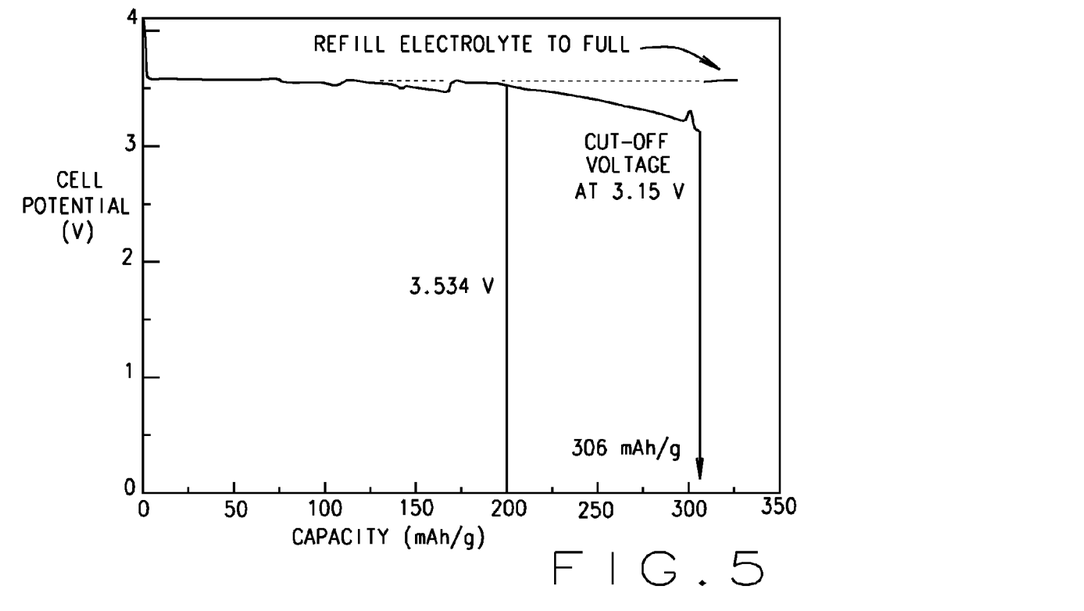
FIG. 5 is an exemplary graphical illustration of the constant current density discharge (0.2 $mA/cm^2$) of the hybrid metal-air battery shown in FIG. 1 having a Li-air cathode, such as that shown in FIG. 2, wherein the Li-air cathode has an area of 10 $cm^2$ with a 5 wt. % Pt/CNT cathode at 25° C. and in an ambient environment, and 1.0 M $H_2SO_4$ as the catholyte, and further illustrating that a refill of fresh electrolyte in the HyLAB recovers the cell performance, in accordance with various embodiments of the present disclosure.
Figure 6:
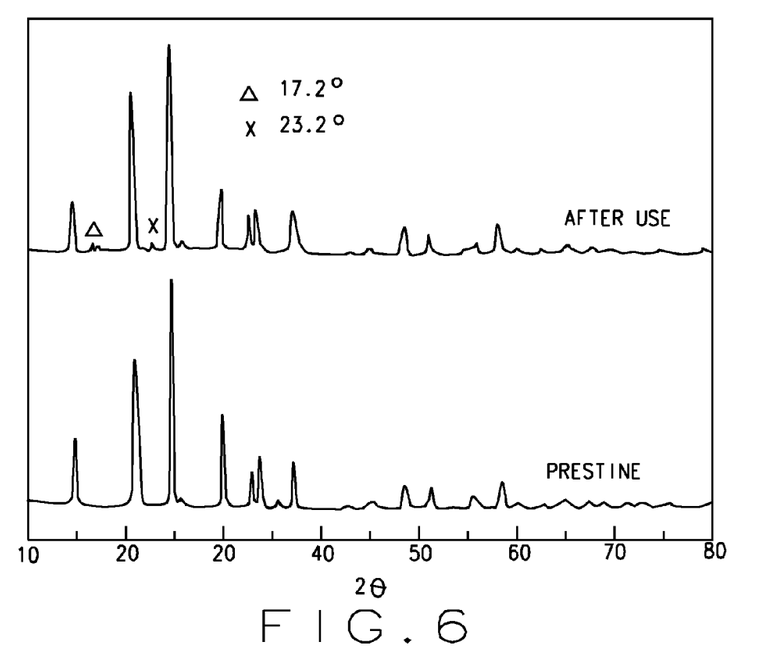
FIG. 6 is an exemplary graphical illustration of the X-Ray diffraction (XRD) patterns of a combined catalyst/transition layer of the air cathode of the hybrid battery shown in FIG. 1 having a Li-air cathode, such as that shown in FIG. 2, in a pristine state and after use, in accordance with various embodiments of the present disclosure.

The results shown in FIG. 5 were obtained from a long-time cell discharge at 0.2 mA/cm$^2$ with an excess amount of sulfuric acid, i.e., 5 mL of 1.0 M $H_2SO_4$ (0.49 g acid in weight). The HyLAB 10 potential was stable for a period of 49.5 hours with a cell potential as high as 3.534V, which provides 202 mAh/g of specific capacity, based on the mass of sulfuric acid catolyte 18. The utilization of the sulfuric acid catholyte 18 was found to be 36.9% at 49.5 hours. The specific energy at this point calculated from the discharge capacity and cell potential was found to be 717 Wh/kg.

After the approximately 50 hours discharge, the potential of the HyLABs 10 started to decrease slowly. When the cut off potential was set to 3.15V, a tested HyLAB 10 had a total discharge time of 75 hours. The utilization of acid was at 55.6%. At this point, however, the HyLAB 10 produced a specific capacity of 306 mAh/g and a specific energy of 1067 Wh/kg. Given that the utilization of the sulfuric acid catholyte 18 of the HyLABs 10 described, further improvement in performance, via the HyLAB 10, is very likely and could lead to reaching long range driving distances, e.g., 350 miles with a single charge.

The discharging performance of the HyLABs 10 is independent from the concentration of sulfuric acid 18 as long as the proton existence is not negligible and the Pt catalyst is active. However, when the catholyte 18 was neutral with only 1 M $Li_2SO_4$, the potential of the HyLAB 10 dropped drastically to 2.6 V at 0.5 mA/cm². This shows that water as an active electrolyte is not efficient. Water will be involved in the reactions when sulfuric acid runs out in over-discharge of the cell and the electrolyte will turn to basic. However, sulfuric acid is the only active electrolyte in these experiments and it was not over charged. Consequently, the tested HyLABs 10 exhibited a higher voltage, as expected, when protons are involved in the electrochemical reactions.

Figure 7A:
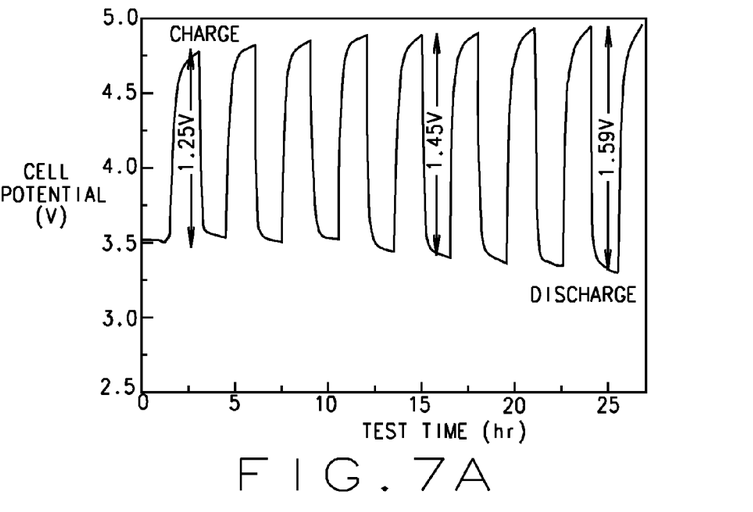
FIGS. 7A and 7B are exemplary graphical illustrations of charge-discharge performance of the hybrid battery shown in FIG. 1 having a Li-air cathode, such as that shown in FIG. 2, wherein the Li-air cathode has an area of 10 $cm^2$ with a 5 wt. % Pt/CNT cathode at 0.2 $mA/cm^2$ at 25° C. and in ambient air, using $H_2SO_4$ as catholyte with concentrations of (A) 1.0 M and (B) 0.01 M, in accordance with various embodiments of the present disclosure.

Cycling results of the tested HyLABs 10 at 0.2 mA/cm² are presented in FIG. 7A. The duration for charge or discharge was 1.5 hours, and there were 9 cycles with a total of 27 hours. The potential difference between the discharge and charge potentials at the beginning was about 1.25 V, and it increased slowly to 1.45 V after 5 cycles and to 1.59 V at the end of the cycling test. While Pt is good for ORR, its surface oxide formation at high overpotentials does not facilitate oxygen evolution reaction (OER), which is the reverse reaction of ORR occurred during recharge. It was expected that Pt in sulfuric acid would have a 210 mV overpotential at the first 3 hours and up to 970 mV for a longer term. However, such high overpotentials can be reduced by using an effective catalyst, such as a bifunctional catalyst as described below.

Figure 7B:
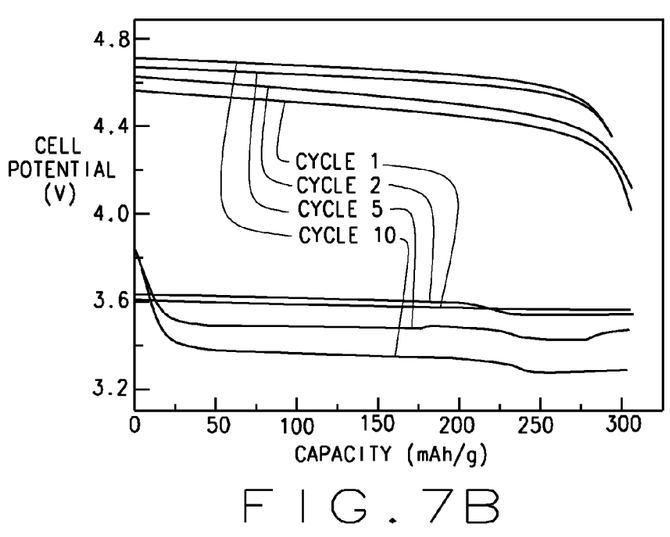

Further discharge-charge experiments are presented in FIG. 7B, wherein a diluted 0.01 M diluted sulfuric acid was used in a new cell to investigate rechargeability. Diluted acid would reduce oxidation rate of the Pt catalyst. In order to keep constant capacity in long-term discharge, the charge capacity was cut off at 306 mAh/g. Again, the acid was found to have a utility percentage of approximately 56% at the capacity of 306 mAh/g. It should be noted that the concentration of sulfuric acid did not notably impact the cell performance, indicating good ORR activity of Pt in sulfuric acid. The cell was discharge/charged 10 times in the same manner. FIG. 7B illustrates the performance of charge/discharge capacity vs. cell potential in cycle 1, 2, 5, and 10. The potential difference between the discharge and charge potentials at the beginning was about 0.89 V, and it increased slowly to 1.19 V after 5 cycles and further to 1.37 V at the end of the cycling test, which are smaller than those in the more concentrated acids, as expected.

In summary, sulfuric acid is demonstrated to be a viable catholyte in the hybrid metal-air battery 10, e.g., the HyLAB cell 10, of the present disclosure, wherein, in various embodiments, the hybrid metal-air battery 10 has a large electrode area, e.g., approximately 10 cm². Additionally, utilizing a low loading of Pt, e.g., $5 \times 10^{-5}$ g/cm², as electrocatalyst in the hybrid metal-air battery 10 of the present disclosure, can produce a high battery capacity and specific energy in the rechargeable hybrid metal-air battery 10. Furthermore, it was shown that the cathode catalyst layer 42 comprising Pt/CNT is better than that made with Pt/CB. The better performance was attributed to the more open porous structures formed in fibrous CNTs. At a cut-off voltage of 3.15 V, the tested hybrid metal-air batteries 10, e.g., the tested HyLABs 10, achieved a discharge capacity of 306 mAh/g and a specific energy of 1067 Wh/kg at 0.2 mA/cm² based on the total weight of acid in the cell. Increased overpotentials during charge/discharge were observed in cycling.

Referring now to FIGS. 8-14, to improve rechargeability of the hybrid metal-air battery 10, in various embodiments the active catalyst layer 42 can comprise a bifunctional electrocatalyst, such as $Pt/IrO_2$, supported on CNTs. Test results are provided below comparing the rechargeability of the hybrid metal-air battery 10, e.g., the HyLAB 10, with the layered metal-air cathode 30, e.g., the layered Li-air cathode 30, having the active catalyst layer 42 comprising the electrocatalyst Pt/CNTs, as described above, and having the active catalyst layer 42 comprising a bifunctional electrocatalyst $Pt/IrO_2$/CNTs. The hybrid metal-air batteries 10, e.g., the HyLABs 10, will sometimes be referred to as the cells below.

To produce the bifunctional electrocatalyst $Pt/IrO_2$/CNTs, CNTs (50±15 nm) were treated with 3:1 $H_2SO_4/HNO_3$ (volume ratio) in an ultrasonic bath at 60° C. for 2 hours for surface functionalization, followed by filtration and thorough washing with deionized water. 10 mg of the functionalized CNTs were then dispersed in 10 ml ethylene glycol plus 5 ml deionized water with the aid of sonication and stirring. Predetermined amount of 0.01 M $K_3IrCl_6$ salt solution was pipetted into the above suspension and it was stirred under reflux conditions for reactions for 2 hours. The iridium salt was reduced to metallic Ir to form Ir nanoparticles deposited on the CNTs (Ir/CNTs), which were separated out with a centrifuge. The product was thoroughly washed and dried at 80° C. in a vacuum oven overnight. It was then annealed in air at 400° C. for 2 hours to oxidize the metallic Ir nanoparticles into crystalline iridium oxide ($IrO_2$), leading to a final 10 wt. % $IrO_2$ loading on the CNTs. That catalyst was further made into a suspension, and deposition of 5 wt. % Pt on $IrO_2$/CNTs was achieved by a polyol process to produce the bifunctional catalyst $Pt/IrO_2$/CNTs. Using bare CNTs, Pt was also deposited on CNTs to make Pt/CNTs without iridium oxides, as described above.

Cyclic voltammetry (CV) and OER measurements were carried out in $N_2$ purged 1.0 M $H_2SO_4$ at potential range of 0-1.5 V and 0.8-1.6 V (vs. RHE), respectively. ORR measurement was taken in an $O_2$-saturated 1.0 M $H_2SO_4$ at rotating speed of 1600 rpm between 0.2-1.0 V (vs. RHE). To study the durability of $Pt/IrO_2$/CNTs, CV was conducted in $N_2$-bubbled 1.0 M $H_2SO_4$ in the potential range between 0.6 and 1.5 V (vs. RHE) up to 1000 cycles. The initial and final CV and ORR behaviors were recorded. For comparison, Pt/CNTs catalyst was also tested under the same cycling conditions. Current densities were calculated based on the total catalyst weight normalized to mA/mg.

The tests of the hybrid metal-air battery 10, e.g., the HyLAB 10, having the bifunctional catalyst $Pt/IrO_2$/CNTs were performed in an ambient environment and at room temperature. 0.01 mA/cm², 0.2 mA/cm², 0.5 mA/cm², and 1.0 mA/cm² discharge current densities were chosen for cell test in 1.0 M sulfuric acid. For long-term discharge and charge experiments, 0.2 mA/cm² current density was used. The Pt/CNTs and Pt/IrO2/CNTs were compared, as described below, to demonstrate the advantage of the bifunctional catalyst.

Figure 8:
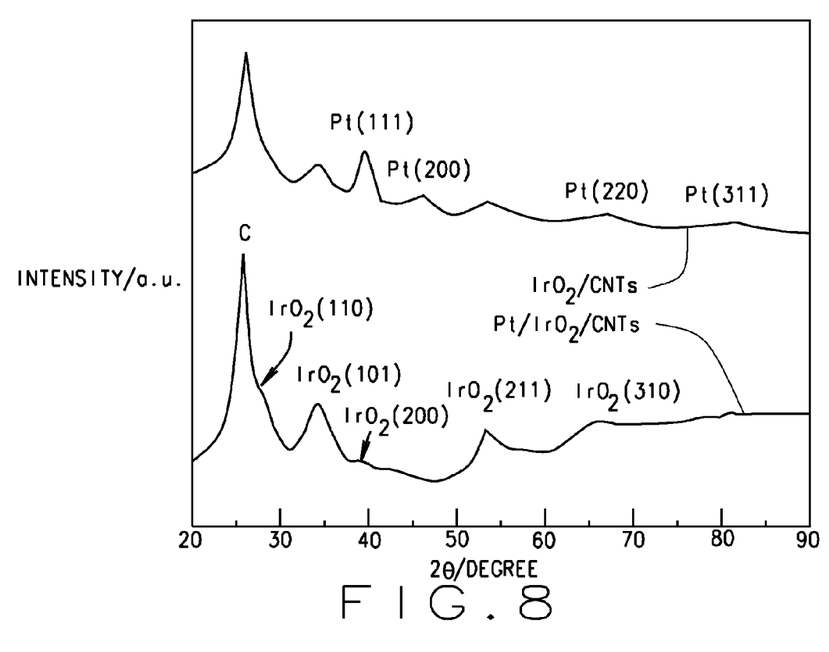
FIG. 8 is an exemplary graphical illustration of crystalline information of the hybrid battery shown in FIG. 1 having a $IrO_2$/CNTs catalyst and a bifunctional Pt/$IrO_2$/CNTs catalyst, in accordance with various embodiments of the present disclosure.
Figure 9A:
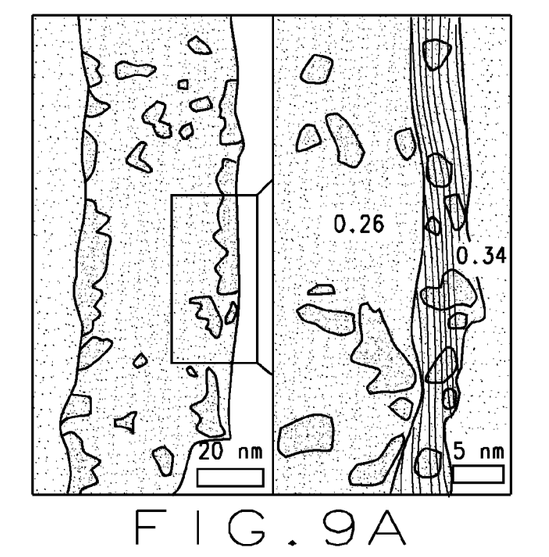
FIGS. 9A and 9B provide transmission electron microscope (TEM) images, wherein (A) shows a catalyst comprising the $IrO_2$/CNTs; and (B) shows the morphology of the $IrO_2$/CNTs after the disposition of Pt thereon, in accordance with various embodiments of the present disclosure.

To perform the testing of the bifunctional electrocatalyst, crystalline information of the catalyst was obtained from X-ray diffraction. XRD patterns of $IrO_2$/CNTs and Pt/$IrO_2$/CNTs are shown in FIG. 8. The absence of Ir metal diffraction and the presence of characteristic peaks belonging to rutile $IrO_2$ 22 in $IrO_2$/CNTs indicate complete transformation of metallic Ir to crystalline $IrO_2$. After Pt deposition, the crystalline form of $IrO_2$ remains unchanged in the catalyst. The peak at approximately 26° is ascribed to graphite, from the graphitic structure of the CNT support. FIG. 9A shows a TEM image of the $IrO_2$/CNTs. It can be seen that the nanotube surface was uniformly covered with $IrO_2$ particles, and despite some in agglomerates there are no apparent sintering so that their nanoparticulate entity is retained after transformation. The two-step procedure was designed to uniformly deposit Ir on the CNTs first, and then convert it to $IrO_2$. This method can guarantee the uniform dispersion of $IrO_2$ with minimum aggregation and maximize the utilization of the active oxide surface.

Figure 9B:
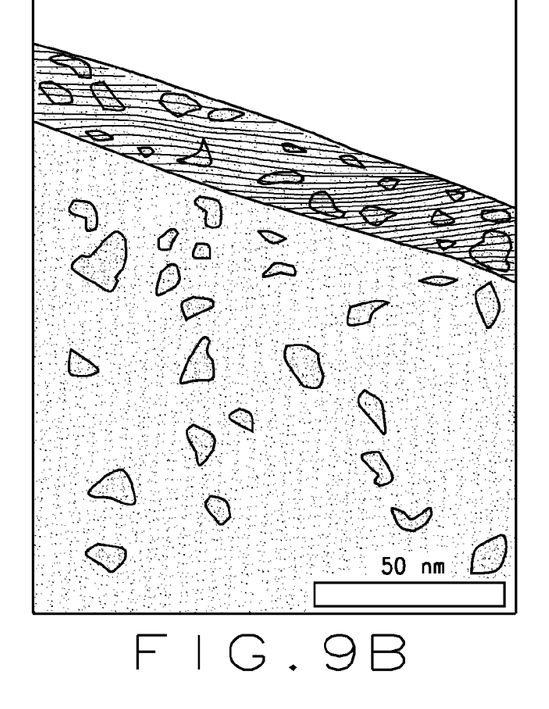

The mean size of $IrO_2$ was measured to be 3.6±0.5 nm from image analysis. The high magnification image in FIG. 9A shows lattice spacing of the graphitic layers of CNTs and rutile $IrO_2$ at 0.34 and 0.26 nm, respectively. The former is characteristic of basal planes in graphite, and the latter is characteristic of the (101) planes in rutile $IrO_2$. After deposition of Pt on $IrO_2$/CNTs, the morphology of $IrO_2$ does not shownchanges, as illustrated in FIG. 9B. The XRD patterns show that Pt now appears in the catalyst. Carefully examining the surface of the catalyst Pt/$IrO_2$/CNTs, there exist many round darker black nanoparticles. These nanoparticles are believed to be Pt since stronger lattice diffraction occurs in metals than in oxides, giving the contrast. These nanoparticles are measured to have a size of 2.3±0.2 nm.

The prepared catalysts were put under electrochemical tests in a three-electrode cell. The CV plots of catalysts Pt/CNTs, $IrO_2$/CNTs and Pt/$IrO_2$/CNTs were presented in FIG. 10A. The anodic peak at 0.66 V and cathodic peak at 0.58 V were associated with the redox reactions of surface oxide groups, which have been found in acid-treated CNTs. The anodic current occurred beyond 1.4 V (vs. RHE) was assigned to water oxidation currents. The $IrO_2$ was found to be electrochemical inert in the potential range 0-1.4V and have negligible contribution to the electrochemical surface area (ESA), while the Pt/$IrO_2$/CNTs exhibit the typical peaks belonging to hydrogen ad/de-sorption on Pt surface. The ESA in Pt/$IrO_2$/CNTs was shown to be 905.7 cm²/mg Pt, close to the 996.2 cm²/mg Pt obtained for Pt/CNTs, indicating that Pt active surface area is large in both catalysts.

Figure 10A:
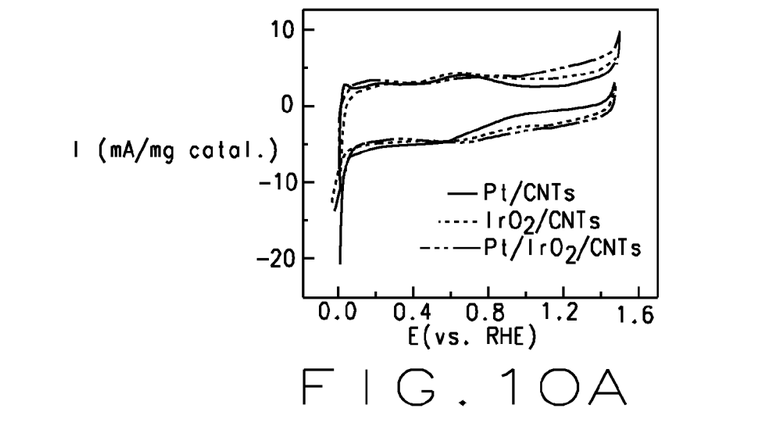
FIGS. 10A, 10B and 10C are exemplary graphical illustrations of various test results of the catalysts Pt/CNTs, $IrO_2$/CNTs and Pt/$IrO_2$/CNTs, wherein: (A) shows current/voltage (CV) plots of the catalysts Pt/CNTs, $IrO_2$/CNTs and Pt/$IrO_2$/CNTs; (B) shows ORR activities of the $IrO_2$/CNT, Pt/CNT and Pt/$IrO_2$/CNTs catalysts; (C) shows linear sweep voltammetry (LSV) conducted to record the OER performances of the $IrO_2$/CNT, Pt/CNT and Pt/$IrO_2$/CNTs catalysts, in accordance with various embodiments of the present disclosure.
Figure 10B:
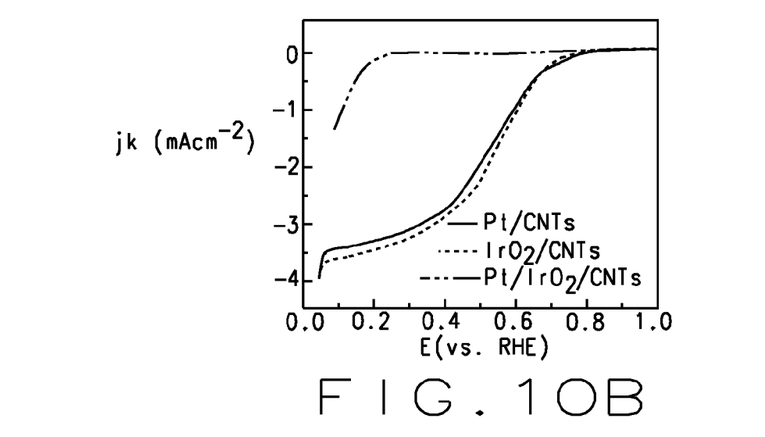
Figure 10C:
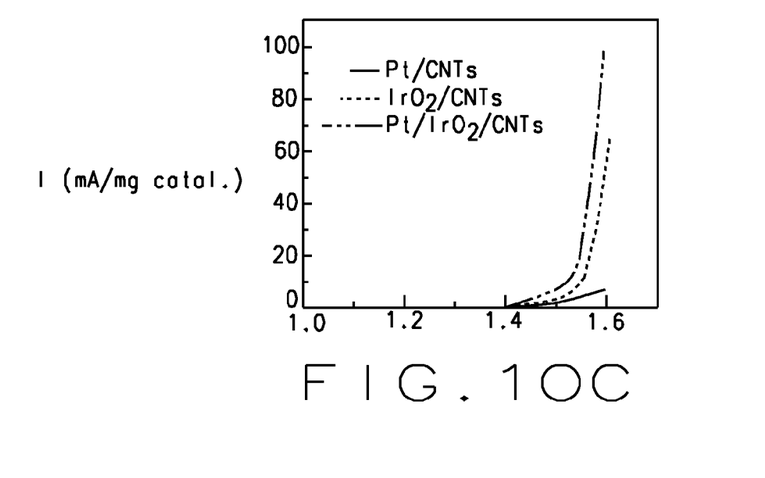

The ORR activities of $IrO_2$/CNT, Pt/CNT and Pt/$IrO_2$/CNTs were plotted in FIG. 10B. $IrO_2$/CNTs exhibits negligible catalytic activity and has no contribution towards ORR. Meanwhile, Pt/$IrO_2$/CNTs showed a similar ORR performance as Pt/CNTs with the same Pt loading, suggesting that $IrO_2$ has not affected Pt for catalyzing ORR. Linear sweep voltammetry (LSV) was conducted to record the OER performances of the three different catalysts. As shown in FIG. 10C, Pt has some catalytic activity towards OER (all OER currents were capacitance-corrected, but is significantly lower when compared to that from $IrO_2$. The mass activity of $IrO_2$/CNTs at overpotential $\eta$=0.25 V can reach 6 A/g $IrO_2$ without Ohmic correction, respectively, at the same overpotential. It was shown that by incorporating Pt with $IrO_2$/CNTs, a significantly higher current density can be achieved than $IrO_2$/CNTs alone (e.g., 96 mA/mg catal. vs. 56 mA/mg catal. at 1.6 V), which is also higher than the sum of $IrO_2$/CNTs and Pt/CNTs, indicative that there may be a possible synergistic effect between Pt and the oxide $IrO_2$ for OER.

Figure 11A:
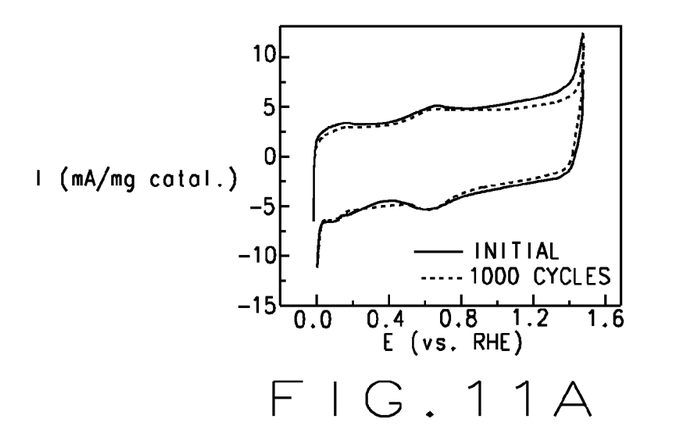
FIGS. 11A, 11B and 11C are exemplary graphical illustrations of various test results for the Pt/$IrO_2$/CNTs catalysts, wherein: (A) illustrates the stability of the Pt/$IrO_2$/CNTs catalyst; (B) illustrates the ORR half-wave potential of the Pt/$IrO_2$/CNTs catalyst; and (C) illustrates changes of the catalyst Pt/$IrO_2$/CNTs after cycling, in accordance with various embodiments of the present disclosure.
Figure 11B:
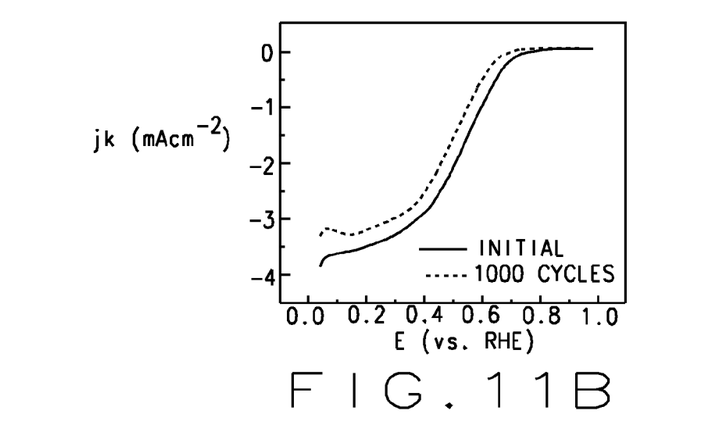
Figure 11C:
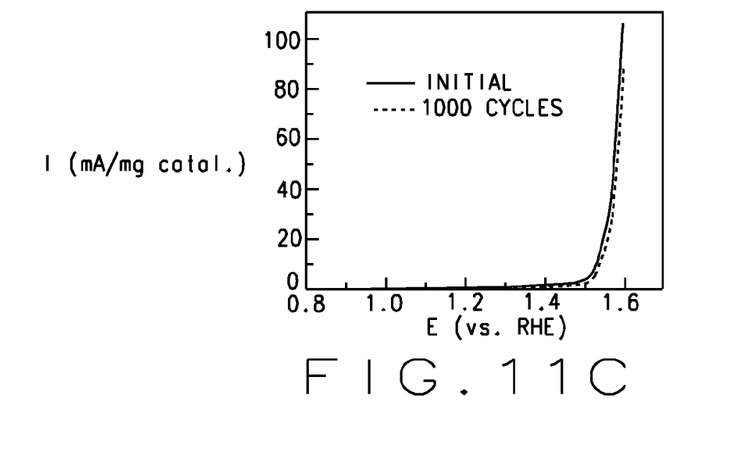

To gain information about the stability of the catalyst Pt/$IrO_2$/CNTs, accelerated cycling test was performed by applying 1000 potential cycles from 0.6-1.5 V (vs. RHE) in $N_2$-bubbled 1.0 M $H_2SO_4$. As shown in FIG. 11A, Pt in this catalyst only suffered very small surface area loss, verified by negligible change in H ad/de-sorption region of 0.05-0.4 V before and after the potential cycling tests. In contrast, ESA of Pt/CNTs suffered a much larger loss after 1000 cycles, from 996 to 230 cm²/mg Pt, leading to a severe degradation of ORR performances. FIG. 11B shows that the ORR half-wave potential shifted 40 mV negatively, indicative of an ORR activity loss, but it's much smaller than that of the Pt/CNT catalyst. Decrease in ORR activity is also attributed to the formation of a thin Pt-oxide layer at high potentials.

Figure 12:
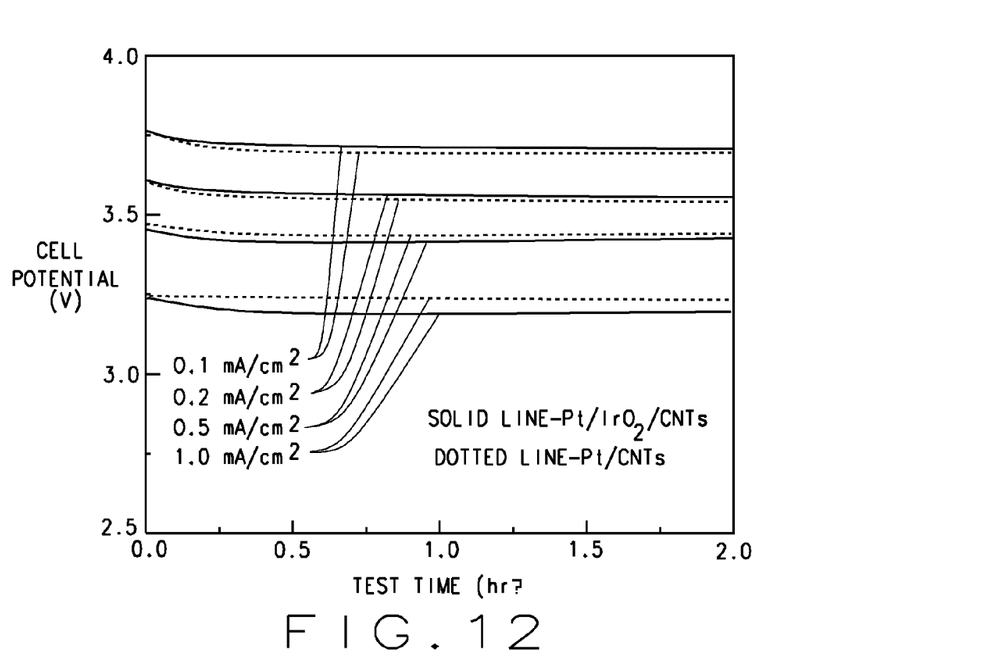
FIG. 12 is an exemplary graphical illustration of the discharge of the hybrid metal-air battery shown in FIG. 1 having a Li-air cathode, such as that shown in FIG. 2, using Pt/CNTs and Pt/$IrO_2$/CNTs as catalysts in the Li-air cathode at different discharge current densities, in accordance with various embodiments of the present disclosure.

FIG. 12 presents the discharge of a hybrid metal-air battery 10, e.g., the HyLAB 10, using Pt/CNTs or Pt/$IrO_2$/CNTs as catalysts in the cathode at different discharge current densities. The operation potentials dropped from 3.72 to 3.21 V with increasing current densities from 0.1 to 1.0 mA/cm². This polarization was attributed to the internal resistance at the anode side. 12, 25 At 0.1~0.5 mA/cm² discharge current densities, the cell performance with Pt/CNTs or Pt/$IrO_2$/CNTs is very close as seen from FIG. 12, indicating that there are no significant catalytic differences between Pt/CNTs and Pt/$IrO_2$/CNTs towards ORR. This observation supports the findings that $IrO_2$ has negligible contribution to ORR.

Figure 13A:
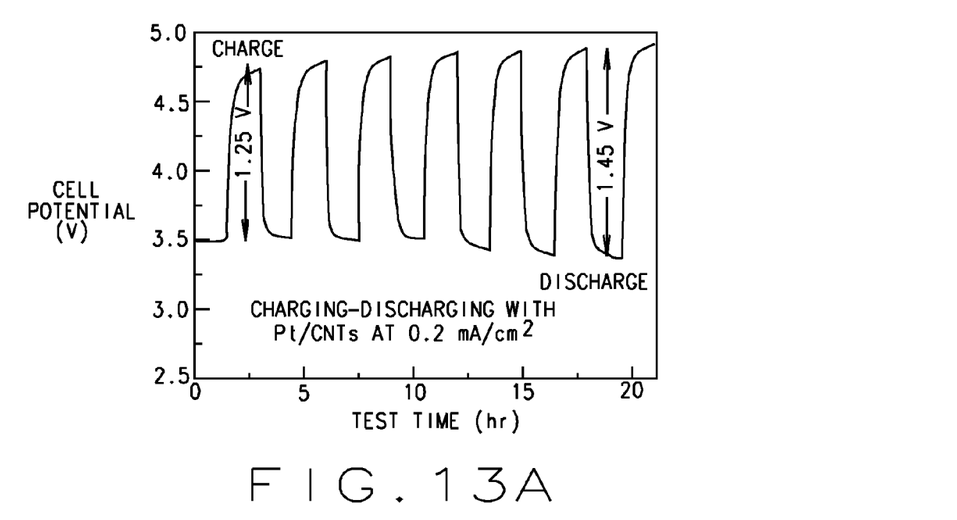
FIGS. 13A and 13B are exemplary graphical illustration of cycling results the hybrid metal-air battery shown in FIG. 1 having a Li-air cathode, such as that shown in FIG. 2, using Pt/CNTs and Pt/$IrO_2$/CNTs as catalysts in the Li-air cathode, in accordance with various embodiments of the present disclosure.
Figure 13B:
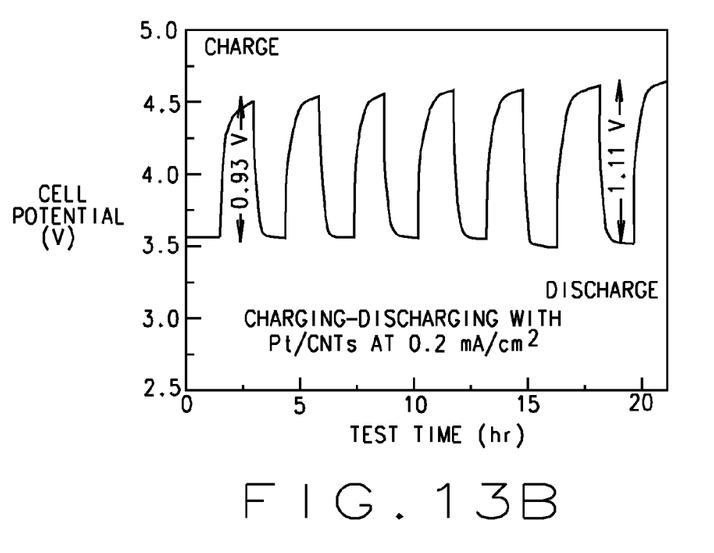

Cycling results of the hybrid metal-air battery 10, e.g., the HyLAB 10, with Pt/CNTs or Pt/$IrO_2$/CNTs at 0.2 mA/cm² are presented in FIGS. 13A and 13B. The duration for charge and discharge was set at 1.5 hours each, and the cell was cycled for 21 hours. Using Pt/CNTs as the cathode catalyst, the potential gap between the charge and discharge was about 1.25 V initially, and it slowly increased to 1.45 V after 6 cycles, as shown in FIG. 13A. A loss of the discharge potential was recorded from 3.50 to 3.36 V, indicative of that a higher overpotential was induced in order to initiate the ORR, attributed to surface oxide formation on Pt.

In the case of Pt/$IrO_2$/CNTs, the obvious degradation was alleviated as illustrated in FIG. 13B. Each discharge/charge cycle exhibited flat potential curves and the corresponding potential gap at the beginning and after 6 cycles were 0.93 V and 1.11 V, respectively, showing much improved stability over Pt/CNTs. Throughout the entire cycling, the discharge potentials remained well at 3.5 V, similar to the discharging potential with catalyst Pt/CNTs. Consequently, the hybrid metal-air battery 10, e.g., the HyLAB 10, exhibited a much improved discharge performance. As an OER catalyst, $IrO_2$ not only decreases the charging overpotential, but also protects Pt from over-oxidation.

Figure 14:
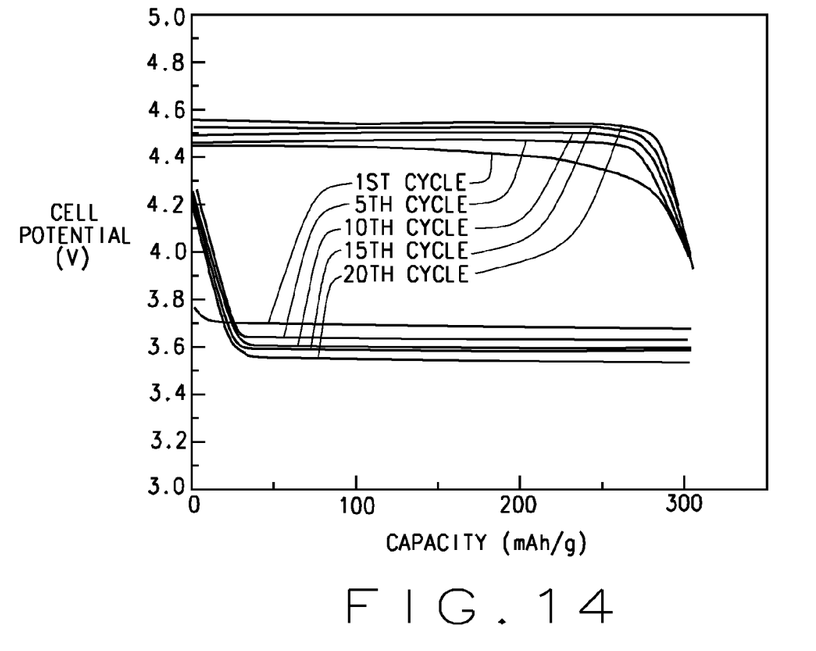
FIG. 14 is and exemplary graphical illustration of the flat discharge-charge potential curves for the hybrid metal-air battery shown in FIG. 1 having a Li-air cathode, such as that shown in FIG. 2, using Pt/$IrO_2$/CNTs as the catalyst, at 0.2 $mA/cm^2$, in accordance with various embodiments of the present disclosure.

As exemplarily illustrated in FIG. 14, the round trip efficiency is at 81% for the 10th cycle (84% for the 1st cycle). This round trip efficiency is higher than that (72%) obtained previously, and it is also much higher than known reported values (e.g., 65%) in aprotic Li—$O_2$ cells. After 20 cycles, of the hybrid metal-air battery 10, e.g., the HyLAB 10, the charge potential raised 100 mV to 4.55 V. The potential gap between charge and discharge increased to 1.02 V, but this is much smaller than those in concentrated acids, as expected. The mild degradation of cell performance may come from the impedance change caused by the combined catalyst/transition layer 54, e.g., the glass membrane, and inevitable oxidation of Pt metal. In the case of Pt/CNTs, the potential gap increased quickly from 0.89 to 1.37 V after 10 cycles, demonstrating the bifunctional catalyst has significantly reduced the overpotential in the the hybrid metal-air battery 10, e.g., the HyLAB 10, thereby increasing its round trip efficiency and rechargeability.

In summary, with a unique method, an effective bifunctional catalyst, Pt/IrO$_2$/CNTs, has successfully been developed for the hybrid metal-air battery 10, e.g., the HyLAB 10, using sulfuric acid as catholyte. The catalyst exhibits excellent catalytic activities with smaller OER overpotentials, higher OER activity, and better electrochemical stability. Compared to mono Pt catalyst, the introduction of the bifunctional catalyst significantly reduced the charge voltage by more than 300 mV, and thus increased its round trip efficiency from 72% to 81% (evaluated at the 10th cycle) for mono Pt and bifunctional catalyst, respectively. It has been illustrated that the hybrid metal-air battery 10, e.g., the HyLAB 10, can be cycled for 20 times without significant degradation, and with a discharge capacity of 306 mAh/g and specific energy of 1110 Wh/kg.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A layered metal-air cathode for a metal-air battery, said cathode comprising three layers laminated together, the three layers comprising:
    an active catalyst layer;
    a transition layer laminated to the active catalyst layer, the transition layer comprises carbon nanofibers; and
    a backing layer laminated to the transition layer such that the transition layer is disposed between the active catalyst layer and the backing layer.

2. The metal-air cathode of claim 1, wherein the layered metal-air cathode is structured to have a total thickness of between 4-400 μm.

3. The metal-air cathode of claim 1, wherein the active catalyst layer comprises electrocatalyst particles loaded onto one of nanosize carbon materials and metal oxide materials.

4. The metal-air cathode of claim 3, wherein the electrocatalyst comprises one of a single electrocatalyst and a bifunctional electrocatalyst.

5. The metal-air cathode of claim 1, wherein the active catalyst layer is fabricated to have a thickness of between 1-100 μm.

6. The metal-air cathode of claim 1, wherein the transition layer is fabricated to have a thickness of between 5-100 μm.

7. The metal-air cathode of claim 1, wherein the transition layer comprises a hydrophobic polymer.

8. The metal-air cathode of claim 1, wherein the backing layer comprises one of a carbon fiber and a metal mesh having a plurality of open channels of a variety of sizes structured and operable facilitate air diffusion into the layered metal-air cathode.

9. The metal-air cathode of claim 1, wherein the backing layer is fabricated to have a thickness of between 10-300 μm.

* * * * *